United States Patent

Boone et al.

[11] Patent Number: 5,831,874
[45] Date of Patent: *Nov. 3, 1998

[54] METHOD AND SYSTEM FOR CALCULATING A TRANSMITTED SIGNAL CHARACTERISTIC IN AN ENVIRONMENTAL MODEL

[75] Inventors: Theodore Xavier Boone; Hayward Laverne Singletary, both of Bedford, Tex.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 656,029

[22] Filed: May 31, 1996

[51] Int. Cl.$^6$ .................................................. H04B 17/00
[52] U.S. Cl. .......................................... 364/578; 455/67.1
[58] Field of Search ..................................... 364/578, 550; 455/67.6, 52.1, 277.1, 277.2, 67.1, 67.3, 67.2, 67.4, 67.5, 68; 342/359

[56] References Cited

U.S. PATENT DOCUMENTS

| | | | |
|---|---|---|---|
| 5,450,615 | 9/1995 | Fortune et al. | 455/67.6 |
| 5,574,466 | 11/1996 | Reed et al. | 342/359 |

OTHER PUBLICATIONS

Schaubach et al., A ray tracing method for predicting path loss and delay spead in microcellular environments, IEEE, pp. 932–935, May 10, 1992.

Murch et al., Microcell Propagation Prediction Techniques, IEEE, pp. 1–5, Nov. 14, 1994.

Seidel et al., Site specific propagation prediction for wireless in–building personal communication system design, IEEE, pp. 879–891, Nov. 1994.

Bertoni et al., UHF propagation prediction for wireless personal communications, IEEE, pp. 1333–1359, Sep. 1994.

*Primary Examiner*—Kevin J. Teska
*Assistant Examiner*—Matthew Loppnow
*Attorney, Agent, or Firm*—Bruce Terry

[57] ABSTRACT

In a data processing system, a stored environmental model of a wireless communication system is selected. The model locates at least one object in relation to a transmitter. A parent image node is created in an image tree, wherein the parent image node is associated with the transmitter. Child image nodes are created in the image tree only for each object that can redirect a propagating signal from the transmitter with a signal characteristic that exceeds a threshold. The child image node is associated with an object energized by the transmitter, and a corresponding child image in the environment model. Next, a point of interest in the environmental model is selected. Thereafter, an accounting is made for contributions to the signal characteristic at the selected point of interest from each of the child images corresponding to the child image nodes.

21 Claims, 6 Drawing Sheets

METHOD AND SYSTEM FOR CALCULATING A TRANSMITTED SIGNAL CHARACTERISTIC IN AN ENVIRONMENTAL MODEL

FIELD OF THE INVENTION

The present invention is related in general to calculating radio signal propagation, and more particularly to an improved method and system for calculating a transmitted signal characteristic in an environmental model using raytracing techniques.

BACKGROUND OF THE INVENTION

In a wireless communication system, such as a cellular telephone system or personal communications services (PCS) system, base station antennas should be located so that suitable radio signals are available everywhere in the service area.

One way to ensure adequate signal coverage in the service area is to copiously locate base station antennas in the service area. This solution is not practical because purchasing base station equipment and leasing property for base station equipment and antennas is expensive. Therefore, communication systems providers attempt to lower the cost of the communications system by using a minimum number of base stations, each located so that its coverage area does not excessively overlap the coverage of another.

To correctly locate base station antennas in a radio communications system, it is important to be able to accurately predict signal strength, or another signal characteristic, in the service area when a base station antenna is placed in a particular location. Such a prediction is the goal of many so-called raytracing programs. The problem with raytracing programs is the amount of time required to produce an accurate, high-resolution signal strength map of a service area. For example, predicting signal strength in the downtown area of a city can take a raytracing program days, or even weeks to run. The time the raytracing program takes to generate a picture of signal strength in a coverage area is inversely proportional to the accuracy of the picture. Therefore, a usable picture which may be relied upon to locate base station antennas takes a very long time to produce, while a less accurate picture can be produced in a more reasonable amount of time, but cannot be relied upon to place base station antennas.

One reason raytracing programs take so long to produce a signal strength picture is because these programs model the propagation of a transmitted signal. In the coverage area, propagating signals are reflected by walls of buildings, and diffracted by corners of buildings. In the raytracing program, building walls are represented or modeled as panels. Each panel has properties that model the affects of a wall on a propagating signal. Such properties include reflection coefficients and mathematical expressions that model radio wave diffraction at a corner of a panel.

With reference to FIG. 1, there is depicted a transmitted signal reflecting off of a panel, and an equivalent reflected image. As shown, transmitter 20 is located relative to panel 22 in environment model 24. Environment model 24 represents, for example, a portion of the coverage area having buildings that redirect propagating signals radiating from a transmitter antenna. In this example, transmitter 20 is selected to radiate transmitted signals in an arc 26 defined by rays 28 and 30.

After leaving transmitter 20, transmitted signals propagate toward panel 22 and reflect off of panel 22 with a signal strength determined by the material of panel 22 and the incident angle between the ray and panel 22. Thus, in FIG. 1, ray 28 reflects off of panel 22 to produce ray 32, and ray 30 reflects to produce ray 34. The signal strength of ray 32 depends upon the distance traveled by ray 28, incident angle 36, and the reflection coefficient of panel 22.

Note that the signals reflected off of panel 22, such as ray 32 and 34, can be represented as coming from another point source, represented here by child image 38, which can be thought of as the origin of rays 32 and 34. Representing reflected signals as signals transmitted from a child image is a means for simplifying the raytracing problem.

When propagating signals strike a corner, such as the corner of building 46 in FIG. 2, the transmitted signal is diffracted, as indicated by rays 48 and 50. Such a corner, which is called a diffraction corner, may occur at the end of a panel, such as the panels that make up building 46.

Because diffracted rays 48 and 50 behave as though they emanated from diffraction corner 52, diffraction corner 52 may be represented by a child image at the same location, which, again, simplifies the raytracing problem.

With reference now to FIG. 3, there is depicted a more complex environmental model of a communications system service area. If a system designer wants to know the total signal strength of a signal transmitted from transmitter 60 arriving at point of interest 62, the designer must consider signal power propagating directly from transmitter 60 to point of interest 62, as well as reflected and diffracted signal power arriving at point of interest 62. Thus, diffracted signals and signals reflecting off of buildings 64 and 66 may be modeled as rays coming from child images, and grandchild images.

After locating images in the environment model, total signal strength at point of interest 62 may be calculated by accounting for contributions from transmitter 60 through ray 68, from child image 70 through ray 72, from child image 74 through ray 76, and from grandchild image 78 through ray 80. Image 78 is referred to as a grandchild image because that image is a child of a child image. That is, grandchild image 78 is energized, or receives energy from, child image 70. Note that grandchild image 78 is not energized by transmitter 60 (the parent image) because the path between transmitter 60 and grandchild image 78 is obstructed by panel 82.

As may be seen, it doesn't take a very complicated environmental model to produce a tedious calculation for determining the signal strength, or other signal characteristic, of a transmit signal at a point of interest. Furthermore, to be most useful, thousands of points of interest at specified intervals must be considered to produce a useful map of signal coverage in a service area.

With reference now to FIG. 4, there is depicted a tree 100, which is a data structure used in raytracing programs. In tree 100, each node, such as parent node 102, may point to or be associated with a child node, such as child nodes 104 and 106. Similarly, child nodes may point to a grandchild node, and a grandchild node may point to a great grandchild node, such as grandchild node 108 and great grandchild node 110. The same node, say node 108, may be a child node with respect to node 104 one level up, and a grandchild node with respect to node 102 two levels up. Thus, these child-node expressions are relative expressions.

The environment model in FIG. 3 may be represented as a tree. For example, transmitter 60 may be represented in tree 100 as parent node 102. Child image 70 in FIG. 3 may be represented as child node 104 in FIG. 4. Child node 104 is associated with parent node 102 because child image 70 derives its energy from, or is energized by, transmitter 60. Similarly, child image 74 may be represented in tree 100 by child node 106. Child nodes 104 and 106 have direct links to parent node 102 because child images 70 and 74 are directly energized by rays from transmitter 60 in FIG. 3. Child image 78, however, is energized by a reflection off of building 64. Therefore, child image 78 is represented in tree 100 as grandchild node 108. Any rays emanating from child node 78 that strike additional panels to create child images will be represented as a great grandchild node, such as great grandchild node 110. In this manner, the parent image, or transmitter 60, and derivative child images in FIG. 3 may be represented by a tree, such as tree 100 in FIG. 4.

To aid in calculating signal characteristics at a point of interest in the environment model, each node in tree 100 may be associated or linked with various types of data, including location of the node, type of node (reflection or diffraction), scope of the node (angles at which rays depart from the node). This technique for organizing data allows the raytracing program to calculate the effects of each bounce or diffraction along the path between the transmitter and the point of interest.

A problem arises in prior art raytracing programs when the tree representing the environment model grows too large. The tree has grown too large when the raytracing program calculates signal characteristic contributions from child images that are not significant. For example, in FIG. 5, consider signal power arriving at receiver 62 by three rays: ray 122, ray 124 and ray 126. Ray 122 takes an unobstructed direct path between transmitter 128 and receiver 120. This ray makes a significant contribution to the energy received at receiver 120. Ray 124 bounces twice between transmitter 128 and receiver 120—once off of panel 130 and once off of panel 132. Ray 124 does not contribute as much energy as ray 122 because it has traveled further, incurring distance loss, and has been reflected twice, incurring reflection loss.

Ray 126 reflects five times before arriving at receiver 120-three times off panel 130 and two times off of panel 132. In a tree representation of the model in FIG. 5 an image node is created for each reflection or diffraction, which are collectively referred to as redirections of the propagating signal. Therefore, to calculate the energy arriving through ray 126, the raytracing program must traverse the tree through five image node levels, which consumes a large amount of time. This becomes a problem when time is spent computing power at a point-the point of interest-along a ray, and the power level contributed by that ray at that point turns out to be below a level worth considering, such as below the level of ambient noise in the area.

Therefore, a need exists for an improved method and system for calculating transmitted signal characteristics in an environmental model that provides improved speed with minimal reduction in accuracy.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF THE INVENTION

Figure 6:
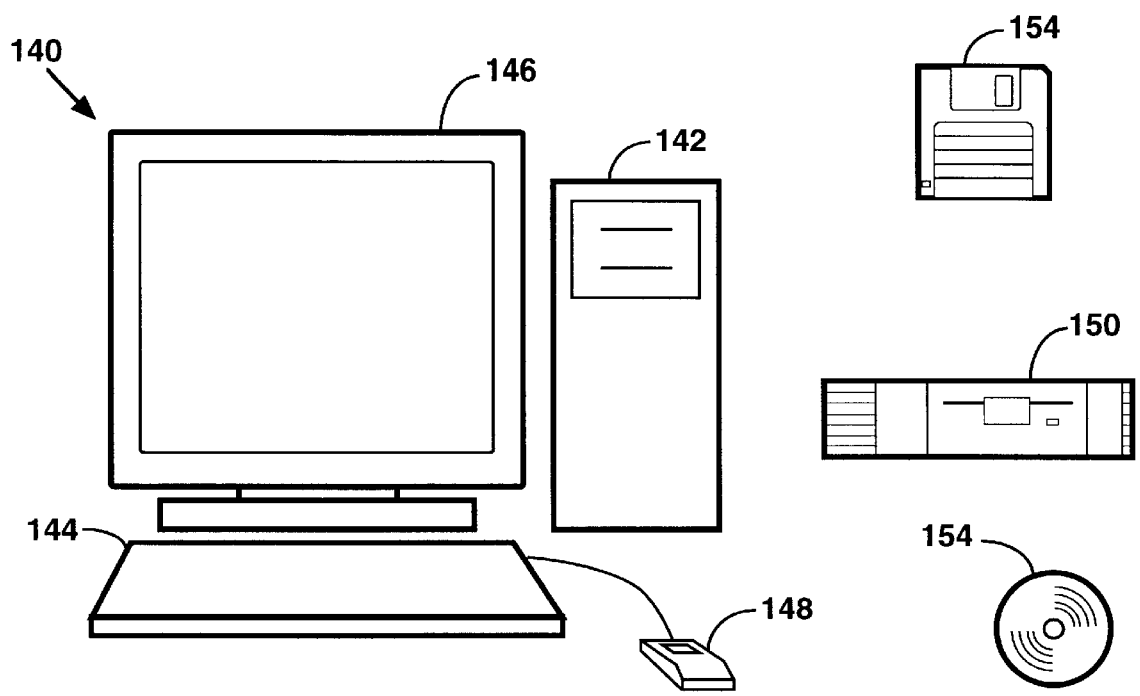
FIG. 6 depicts a data processing system that may be used to implement the method and system of the present invention.

With reference now to FIG. 6, there is depicted a data processing system 140, which may be used to implement the method and system of the present invention. Data processing system 140 may include processor 142, keyboard 144, display 146, and pointing device 148. Keyboard 144 provides means for entering data and commands into processor 142. Display 146 may be implemented utilizing any known means for displaying textual, graphical, or video images, such as a cathode ray tube (CRT), a liquid crystal display (LCD), an electroluminescent panel, or the like. Pointing device 148 may be implemented utilizing any known pointing device, such as a trackball, joystick, touch sensitive tablet or screen, track pad, or as illustrated in FIG. 6, a mouse. Pointing device 148 may be utilized to move a pointer or a cursor on display 146.

Processor 142 may be coupled to one or more peripheral devices, such as CD-ROM 150.

Data processing system 140 includes means for reading data from a storage device. Such means for reading data may include: a hard disk drive internal or external to processor 142 (not shown); a tape drive (not shown); floppy disk drive 152, which reads and writes floppy disks 154; or CD-ROM 150, which reads and/or writes compact disk 154. Such storage means may be referred to as a computer usable medium for storing computer readable program code in the form of data and software.

Data processing system 140 may also be coupled to a network which permits the transfer of data and software between data processing systems. Using such a network, programs can be loaded into data processing system 140.

The components of data processing system 140 discussed above may each be implemented utilizing any one of several known off-the-shelf components. For example, data processing system 140 may be implemented utilizing any general purpose computer or so-called workstation, such as the workstation sold under the trademark "Model 712/60 " by Hewlett-Packard Company of Palo Alto, Calif.

Figure 7:
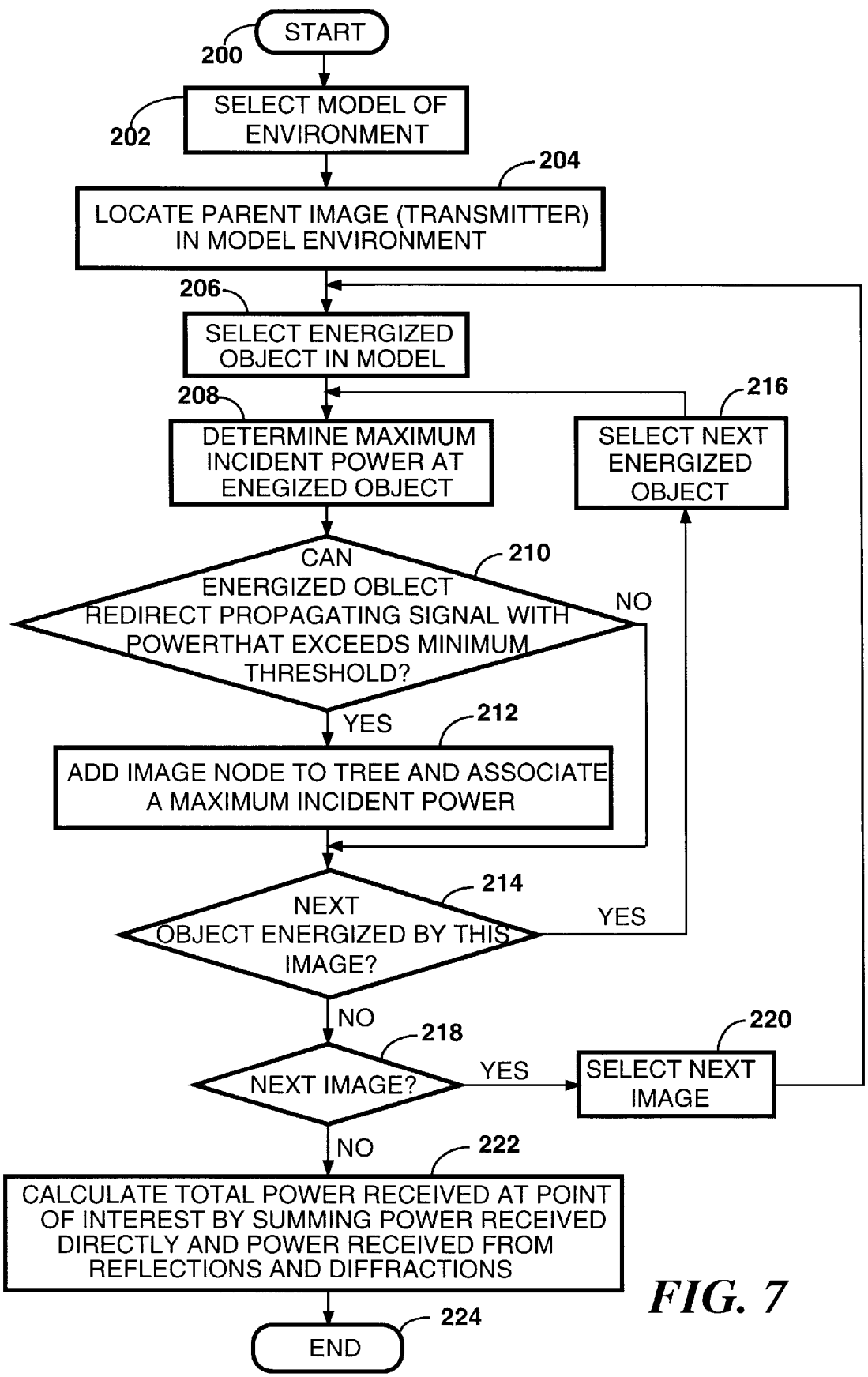
FIG. 7 is a high-level logical flowchart that illustrates the operation of the method and system of the present invention.

Referring now to FIG. 7, there is depicted a high-level logical flowchart that illustrates the operation of the method and system of the present invention. As illustrated, the process begins at block 200 and thereafter passes to block 202, wherein an environment model is selected. This environment model represents a service area for a wireless communication system. The environment model typically shows the location of buildings relative to one another and relative to a base station antenna location. The buildings and structures are typically modeled as panels that can redirect a propagating signal from the transmitter by reflecting or diffracting the propagating signal. The panels, representing structures made of various materials, are typically modeled with coefficients that are used to calculate characteristics of the reflected or diffracted signal, providing a factor for computing a redirected signal with a magnitude that depends in part upon the material.

Next, the parent or transmitter image is located in the model, as depicted at block 204. The position of the transmitter is selected in the model environment so that proposed transmitter locations may be evaluated for signal coverage.

Once the transmitter has been located, the process selects a first energized object in the model, as illustrated at block 206. An energized object is one that is in an unobstructed path from an image, which in this case is the transmitter. Energized objects receive signal energy directly from an image without being blocked, reflected, or diffracted by another object.

Next, the process determines the maximum incident power at the selected energized object, as depicted at block 208. This determination may be implemented by calculating the power received at a point in the panel that is closest to the transmitter. This closest point will receive maximum power because radio frequency energy radiating into free space decreases in power density at more than 20 dB/decade of distance. Antenna radiation patterns may also be considered when calculating maximum incident power.

Next, the process determines whether or not the energized object can redirect the propagating signal with power that exceeds a minimum threshold, as illustrated at block 210. Such redirection of a propagating signal may include reflection and diffraction of the signal. The power in the reflected signal depends on the distance traveled to the panel, the incident angle with the panel, and the reflection coefficient of the panel. Power in diffracted signals are described by a function that depends upon the angle of a redirected ray relative to the incident angle of an energizing ray.

If the energized object can redirect a propagating signal with power that exceeds a minimum threshold, a child image node is added to a tree data structure and a maximum incident power, such as that determined at block 208, is associated with the child image node, as depicted at block 212. Thereafter, the process proceeds to block 214.

If, at block 210, the redirected propagating signal does not exceed a minimum threshold, a child image node is not added to the tree. Because this child image node is not added, rays emanating from an energized object that did not exceed a minimum threshold-such as the noise floor measured in the service area—will not be considered when calculating total power received at a point of interest in the environment model. This means that the tree only includes representations of signal sources, in the form of child nodes, that can contribute a significant amount of power to the power calculation at the point of interest. The method and system of the present invention does not waste time processing rays from images that do not contribute significant levels of power. The fewer images considered during the power calculation, the faster the raytracing program operates.

Next, the process determines whether or not there is another object in the model energized by the current image that has not been previously considered, as illustrated at block 214. If there is another energized object to consider, the next energized object is selected, as depicted at block 216, and the process returns to block 208.

Figure 1:
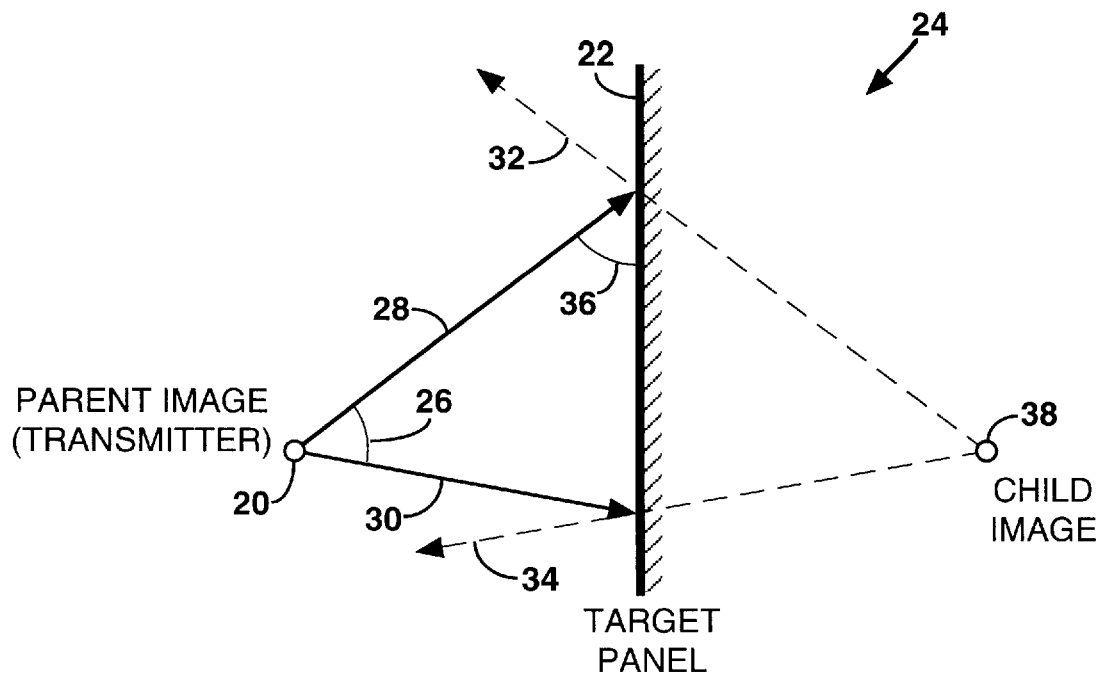
FIG. 1 depicts a transmitted signal reflecting off of a panel.
Figure 2:
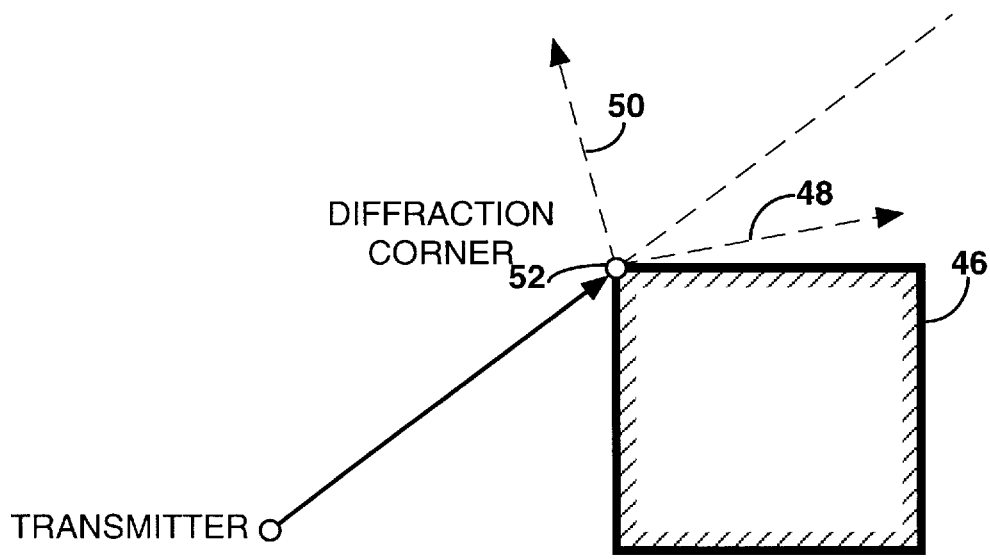
FIG. 2 depicts diffraction of a transmitted signal.
Figure 3:
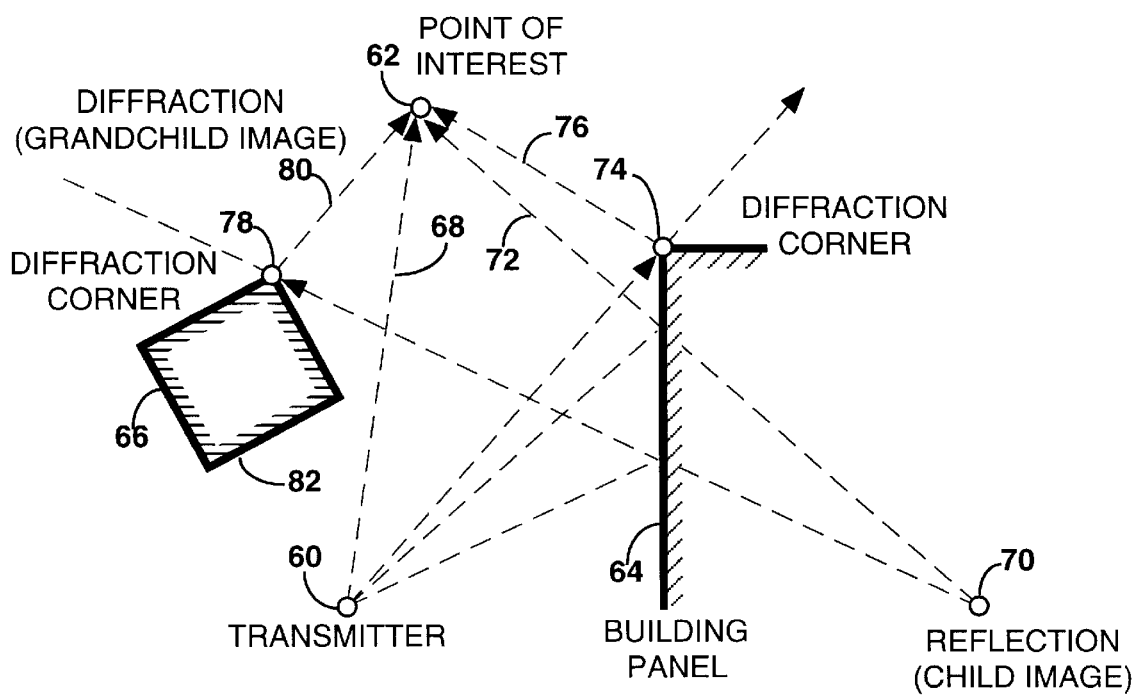
FIG. 3 illustrates an environment model of a wireless system service area.
Figure 4:
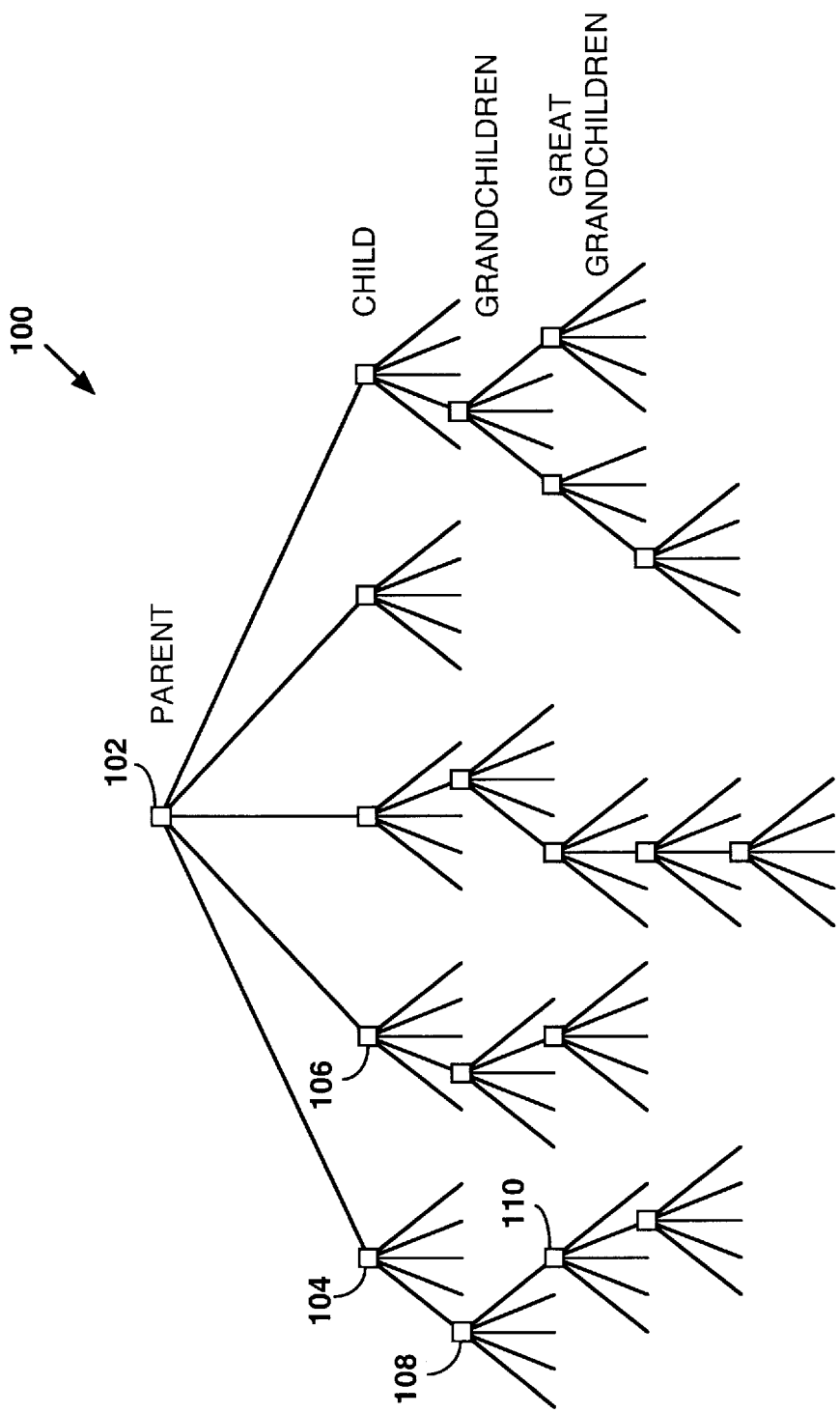
FIG. 4 depicts a data tree for use in a raytracing program.

If all energized objects have been considered, the process has completed building the first level of the tree data structure, such as tree 100 in FIG. 4.

Next, the process determines whether or not other images in the model need to be considered as sources for propagating signals, as illustrated at block 218. Since several child images have probably been created as described above with reference to block 212, each child image should be considered as a new point source for a propagating signal. Thus, if child images need to be considered, a next image is selected, as depicted at block 220, and the process returns to block 206 to consider each object in the model which may be energized by the newly selected image. With every loop from block 218 to block 206, a new level in the tree is created.

If, at block 218, there are no new child images to be considered, the process has finished building the tree. After building the tree, the total power received at a point of interest is calculated by summing power received directly from a transmitter and power received from reflections and diffractions, as depicted at block 222. This calculation involves determining which images can energize the point of interest, and then determining how much power is received from each of those images. These power calculations are made by traversing up and down the tree structure to determine power losses due to path length and power losses due to reflection and diffraction. The process represented by block 222 may include the iterative selection of numerous points of interest so that signal strength over an entire coverage area may be calculated and graphically represented.

After signal strength at all points of interest has been calculated, the process ends as depicted at block 224.

Figure 5:
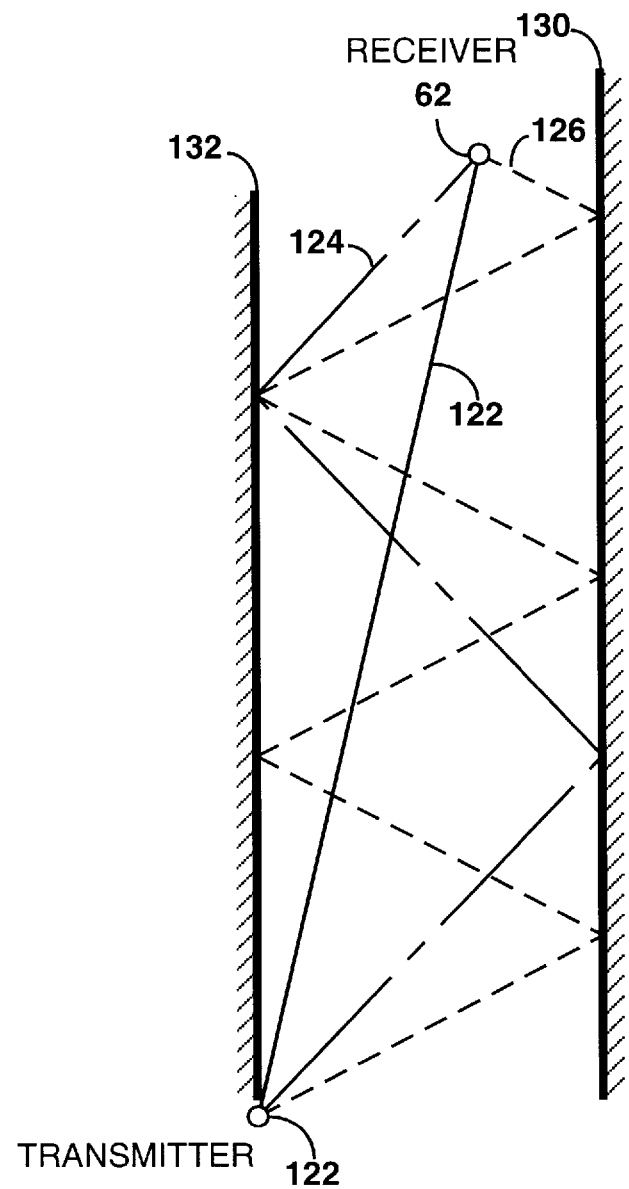
FIG. 5 is a portion of an environment model that shows rays contributing to a signal characteristic at a point of interest.

As shown in FIG. 7, the process executed in the method and system of the present invention saves time by reducing the size of the tree as the tree is constructed. An image that cannot contribute power above a minimum threshold to a point of interest is not represented in the data tree—nor are any descendant images added to the tree. Therefore, with reference to FIG. 5, the image that produces ray 124 may be represented in the data tree because it can contribute a larger, more significant amount of power to receiver 120 than does the image responsible for creating ray 126. Thus, the long and complicated calculation of the energy contributed by ray 126 is eliminated, saving significant time. Because execution time is proportional to the size of the image tree, the fewer number of images created in the tree, the faster the raytracing program finishes.

While the present invention increases the speed of ray tracing, accuracy is not reduced because only images that do not contribute power above a threshold are eliminated from the image tree data structure. To ensure accuracy of the program, the threshold below which child nodes are not added to the tree may be selected by the user. Typically, this threshold is selected to be 10 dB below the noise level measured in the service area. Or for a cellular phone service area, the threshold may be set relative to the emergency handoff power level of the cell.

As indicated above, aspects of this invention pertain to specific method functions implementable on computer systems. In an alternate embodiment, the invention may be implemented as a computer program product for use with a computer or data processing system. Those skilled in the art should readily appreciate that programs defining the functions of the present invention can be delivered to a computer in many forms, which include, but are not limited to: (1) information permanently stored in non-writable storage media (e.g. read-only memory devices such as ROM chips, or CD-ROM disks 154—readable by a computer I/O attachment such as CD-ROM reader 150); (2) information alterably stored on writable storage media (e.g. hard disk drives and floppy disks 154); or (3) information conveyed to a computer through communication media, such as a network, the public switched telephone network, a fiber optic cable, and transmitted radio frequency signals. It should be understood, therefore, that such media, when carrying computer readable instructions that direct the method functions of the present invention, represent alternate embodiments of the present invention.

Although the method and system of the present invention has been shown with an example that calculates signal strength in a service area, those persons skilled in the art should recognize that other signal characteristics, such as a bit error rate, or a signal delay spread, may be calculated.

The foregoing description of a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for calculating a transmitted signal characteristic in an environmental model, said method comprising the steps of:

selecting an environment model that locates at least one object in relation to a transmitter;

creating a parent image node in an image tree, wherein said parent image node is associated with said transmitter;

creating child image nodes in said image tree only for each object that can redirect a propagating signal from said transmitter with a signal characteristic exceeding a threshold, said child image node being associated with an object energized by said transmitter and a corresponding child image in said environment model;

selecting a point of interest in said environmental model; and accounting for contributions to said signal characteristic at said selected point of interest from each of said child images corresponding to said child image nodes.

2. The method for calculating a transmitted signal characteristic according to claim 1 further including the steps of:

for each of said child images, creating grandchild image nodes in said image tree only for each object that can redirect a propagating signal from said child image with a signal characteristic exceeding a threshold, said grandchild image node being associated with an object energized by said child image; and accounting for contributions to said signal characteristic at said selected point of interest from each of said grandchild images corresponding to said grandchild image nodes.

3. The method for calculating a transmitted signal characteristic according to claim 1 wherein said signal characteristic is signal strength.

4. The method for calculating a transmitted signal characteristic according to claim 1 wherein said object includes a panel.

5. The method for calculating a transmitted signal characteristic according to claim 1 wherein said object includes a diffraction corner.

6. The method for calculating a transmitted signal characteristic according to claim 1 wherein said object energized by said transmitter includes an object in an unobstructed path from said transmitter.

7. The method for calculating a transmitted signal characteristic according to claim 1 wherein said threshold has a value equal to an ambient noise signal strength.

8. A system for calculating a transmitted signal characteristic in an environmental model, said system comprising:

means for selecting an environment model that locates at least one object in relation to a transmitter;

means for creating a parent image node in an image tree, wherein said parent image node is associated with said transmitter;

means for creating child image nodes in said image tree only for each object that can redirect a propagating signal from said transmitter with a signal characteristic exceeding a threshold, said child image node being associated with an object energized by said transmitter and a corresponding child image in said environment model;

means for selecting a point of interest in said environmental model; and means for accounting for contributions to said signal characteristic at said selected point of interest from each of said child images corresponding to said child image nodes.

9. The system for calculating a transmitted signal characteristic according to claim 8 further including:

means for creating grandchild image nodes in said image tree only for each object that can redirect a propagating signal from said child image with a signal characteristic exceeding a threshold, said grandchild image node being associated with an object energized by said child image; and means for accounting for contributions to said signal characteristic at said selected point of interest from each of said grandchild images corresponding to said grandchild image nodes.

10. The system for calculating a transmitted signal characteristic according to claim 8 wherein said signal characteristic is signal strength.

11. The system for calculating a transmitted signal characteristic according to claim 8 wherein said object includes a panel.

12. The system for calculating a transmitted signal characteristic according to claim 8 wherein said object includes a diffraction corner.

13. The system for calculating a transmitted signal characteristic according to claim 8 wherein said object energized by said transmitter includes an object in an unobstructed path from said transmitter.

14. The system for calculating a transmitted signal characteristic according to claim 8 wherein said threshold has a value equal to an ambient noise signal strength.

15. A computer program product for calculating a transmitted signal characteristic in an environmental model, said computer program product comprising:

a computer usable medium having computer readable program code means for selecting an environment model that locates at least one object in relation to a transmitter;

a computer usable medium having computer readable program code means for creating a parent image node in an image tree, wherein said parent image node is associated with said transmitter;

a computer usable medium having computer readable program code means for creating child image nodes in said image tree only for each object that can redirect a propagating signal from said transmitter with a signal characteristic exceeding a threshold, said child image node being associated with an object energized by said transmitter and a corresponding child image in said environment model;

a computer usable medium having computer readable program code means for selecting a point of interest in said environmental model; and a computer usable medium having computer readable program code means for accounting for contributions to said signal characteristic at said selected point of interest from each of said child images corresponding to said child image nodes.

16. The computer program product for calculating a transmitted signal characteristic according to claim 15 further including:

a computer usable medium having computer readable program code means for creating grandchild image nodes in said image tree only for each object that can redirect a propagating signal from said child image with a signal characteristic exceeding a threshold, said grandchild image node being associated with an object energized by said child image; and a computer usable medium having computer readable program code means for accounting for contributions to said signal characteristic at said selected point of interest from each of said grandchild images corresponding to said grandchild image nodes.

17. The computer program product for calculating a transmitted signal characteristic according to claim 15 wherein said signal characteristic is signal strength.

18. The computer program product for calculating a transmitted signal characteristic according to claim 15 wherein said object includes a panel.

19. The computer program product for calculating a transmitted signal characteristic according to claim 15 wherein said object includes a diffraction corner.

20. The computer program product for calculating a transmitted signal characteristic according to claim 15 wherein said object energized by said transmitter includes an object in an unobstructed path from said transmitter.

21. The computer program product for calculating a transmitted signal characteristic according to claim 15 wherein said threshold has a value equal to an ambient noise signal strength.

* * * * *